Oct. 21, 1947.   W. A. HYLAND ET AL   2,429,552
CULTIVATOR LIFT MECHANISM
Filed Sept. 10, 1943   5 Sheets-Sheet 1

INVENTORS
WILLIAM A. HYLAND
ERNST E. SCHNELL
BY 
ATTORNEYS

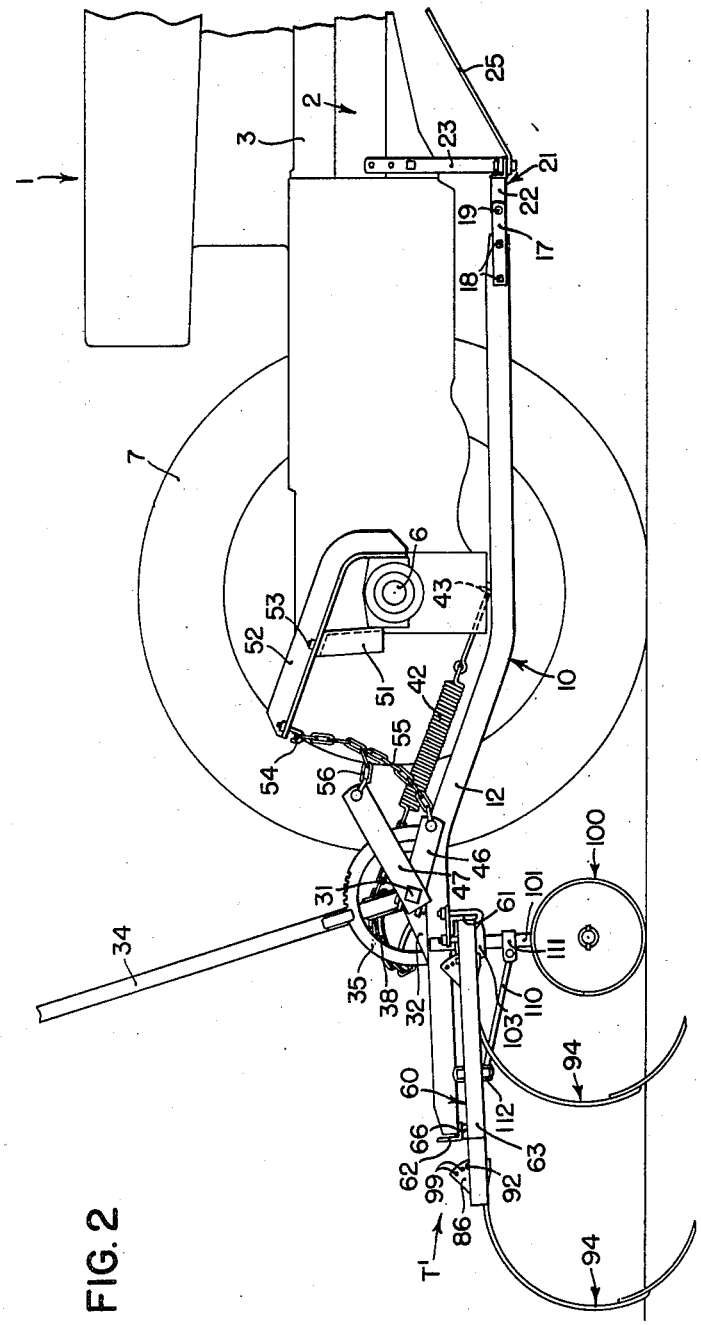
FIG. 2
INVENTORS
WILLIAM A. HYLAND
ERNST E. SCHNELL
ATTORNEYS

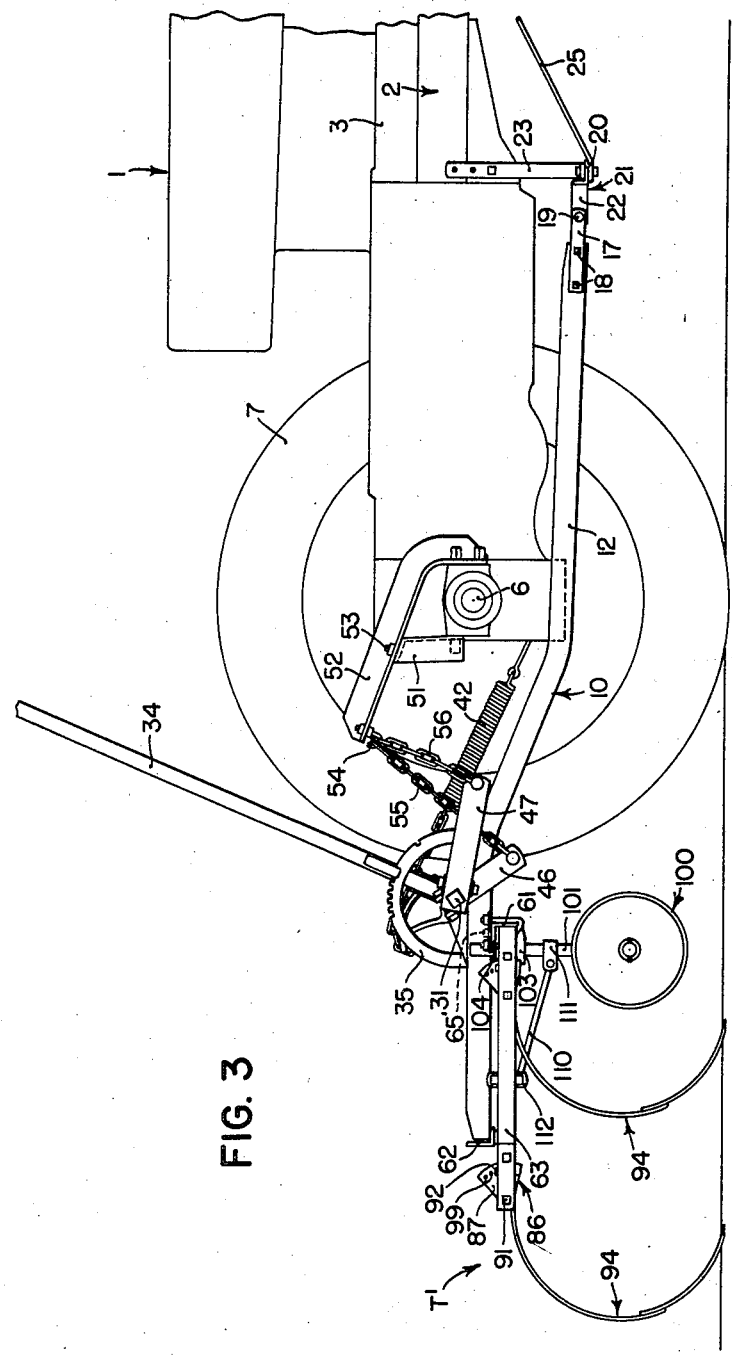

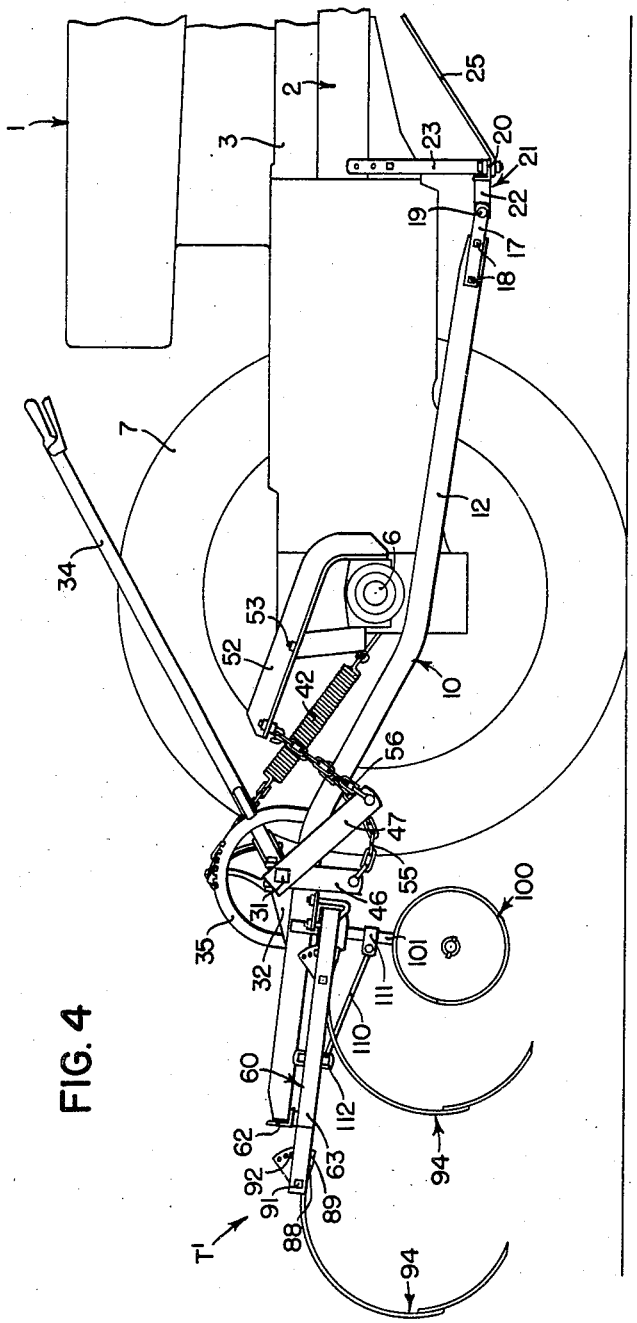

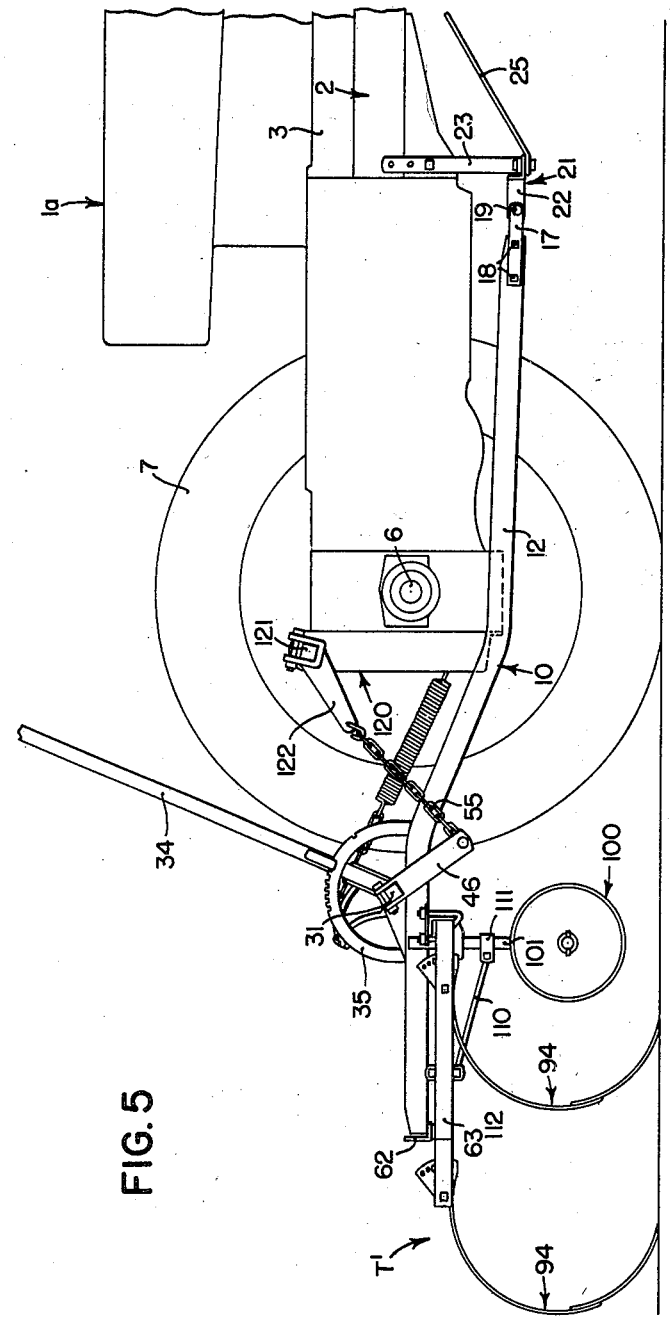

Patented Oct. 21, 1947

2,429,552

UNITED STATES PATENT OFFICE 2,429,552

CULTIVATOR LIFT MECHANISM

William A. Hyland and Ernst E. Schnell, Horicon, Wis., assignors to The Van Brunt Manufacturing Company, Horicon, Wis., a corporation of Wisconsin Application September 10, 1943, Serial No. 501,882

4 Claims. (Cl. 97—47)

The present invention relates generally to agricultural machines and more particularly to cultivating machines of the type that is adapted to be mounted directly on a propelling tractor.

The object and general nature of the present invention is the provision of improved frame and hitch means, with appropriate connections, whereby either a weeder or a field cultivator may be mounted on the implement frame to be propelled by the tractor. Another feature of this invention is the provision of improved power connections arranged whereby movement of an adjusting member on the implement frame may be utilized for adjusting either the weeder or the field cultivator.

A further feature of this invention is the provision of a field cultivator unit having extended cross braces carrying the tools or teeth, and another feature of this invention is the provision of a weeder comprising hingedly connected sections with suitable biasing means serving not only to hold the sections in operating position but also to hold them in an inoperative or transport position, thereby simplifying the construction and enabling the outfit to pass through narrow gates and other restricted areas.

Another feature of the present invention is the provision of improved lifting connections mounted on the frame and connected with the tractor whereby, when first lifting the tools, there is a relatively high ratio of movement of the lifting lever to the corresponding movement of the tool frame, which ratio is materially reduced after the tools have been lifted clear of the ground, at which time the load becomes relatively light. Specifically, it is a feature of this invention to provide a suspension connection between the tractor and a pair of angularly related arms whereby one of said arms and the associated connection is active during one range of movement while the other arm and the other suspension connection are active during raising through the other range.

It is also a feature of this invention to provide an implement for use with a tractor having a power lift, the implement having a hand lever and suitable connections which are adapted to be connected with the tractor power lift, whereby the latter may be utilized for raising or lowering the implement while the adjusting member on the implement itself is utilized for adjusting the depth of operation.

These and other objects and advantages of the present invention will be apparent to those skilled in the art after a consideration of the following detailed description, taken in conjunction with the accompanying drawings.

In the drawings:

Figure 2 is a side view of the implement shown in Figure 1, with the tools in operating position;

Figure 3 is a view similar to Figure 2 showing the tools in partially raised position, in which the ratio of movement of hand lever to movement of tools is relatively high;

Figure 4 is a view similar to Figure 3 but showing the tools in fully raised position; and Figure 5 is a view similar to Figure 2 showing the type of lifting connections employed when the implement is raised by the tractor power lift.

Figure 1:
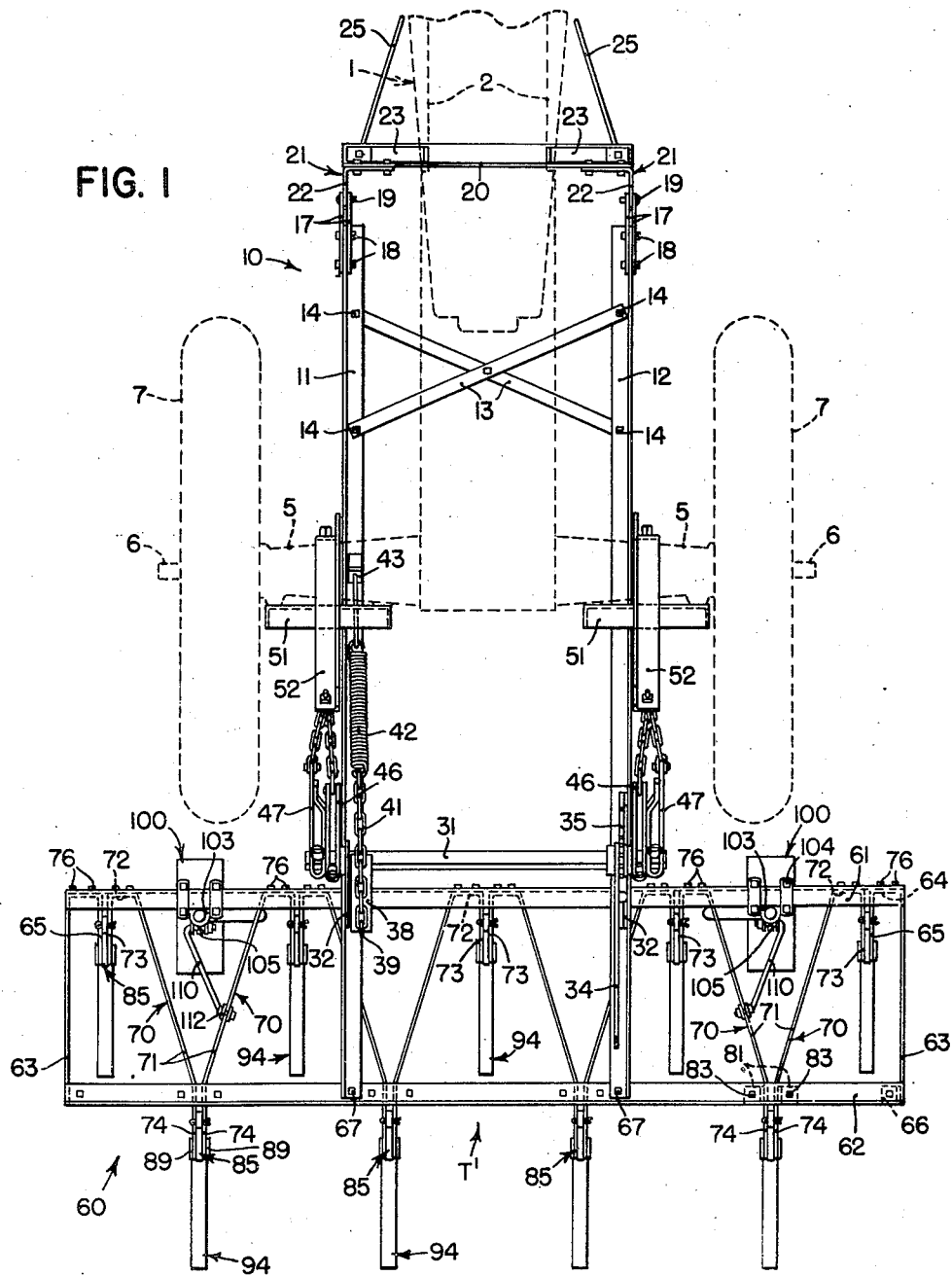
Figure 1 is a plan view of an integral cultivator of the hand lift type in which the principles of the present invention have been incorporated.
Figure 1:

Referring now more particularly to Figures 1 and 2, the tractor is indicated in its entirety by the reference numeral 1 and is of conventional construction, including front steering wheels (not shown), frame means 2, a tractor motor 3 and a rear axle which includes laterally outwardly directed quill sections 5 in which axle shafts 6 are journaled for rotation. Rear traction wheels 7 are fixed to the axle shafts 6. In the tractor 1 shown in Figure 1, no power lift is provided.

An implement frame is indicated in its entirety by the reference numeral 10 and includes a pair of generally longitudinally extending laterally spaced frame bars 11 and 12 connected together at their front ends by a pair of cross braces 13 which are bolted, as at 14, or otherwise secured at their ends to the horizontal flanges of the angles forming the frame bars 11 and 12. Secured to the forward end of each of the frame bars 11 and 12 is a pair of connecting straps 17 which are provided with a plurality of openings to receive bolt means 18 by which the connecting straps may be secured to the frame bars in different positions. The front ends of the straps of each pair are apertured to receive a connecting pin 19. The other frame bar is also provided with a similar pair of connecting straps apertured to receive a connecting pin, and as best shown in Figure 1, the connecting pins 19 serve to pivotally connect the implement frame 10 with an attaching strap 21 which is provided with rearwardly bent apertured ears 22 to receive the pins. The attaching strap member 21 is bolted to a draw angle 20 connected by hanger elements 23 to the frame 2 of the tractor. Also, hitch members 25 are connected at their rear ends to the end portions of the draw angle 20 and at their forward ends to the front portion of the tractor frame. The front braces 13 serve to maintain the frame bars 11 and 12 in laterally spaced relation and the rear ends of the frame bars 11 and 12 are maintained in laterally spaced relation by the tool unit that is attached thereto, as will be explained in detail later.

In order to lift the tools, whether they are weeder elements or spring tooth cultivator teeth, for example, into their transport position, we provide raising means that affords a relatively high ratio of movement of the hand lever to the corresponding movement of the tools in a vertical direction, but after the tools have been lifted up to and above the ground surface, then the lifting connections are adapted to provide a relatively rapid lift to raise the tools into their fully raised or transport position.

Referring now to Figures 2 et seq., a transverse rockshaft 31 is journaled in a pair of brackets 32 fixed, respectively, to the frame bars 11 and 12. A hand lever 34 is clamped to the rockshaft 31 and operates adjacent a sector 35 which is fixed to the right hand frame bar 12. At the other side of the tool frame the rockshaft 31 carries a cam member 38 clamped to the rockshaft adjacent the left hand bracket 32. The cam member is provided with a slot 39 to receive a link of a chain 41 which at its other end is connected to a spring 42 that, in turn, is anchored, as at 43, to a lug carried by the forward portion of the frame bar 11. The cam 38 is shaped so that the spring exerts a substantially constant force tending to turn the rockshaft in a clockwise direction (Figure 2).

The rockshaft 31 extends laterally outwardly beyond the bracket at each side of the frame 10, and secured to each end of the rockshaft 31 is a pair of arms 46 and 47. A bracket support 51 is fixed to the rear side of each of the tractor rear axle extensions 5, and a bracket 52 that is substantially L-shaped is fixed at one end to the forward side of each of the quills 5 and at the other end extends upwardly over and then rearwardly of the associated bracket support 51, being bolted to the latter as indicated at 53. The rear end of each of the brackets 52 is apertured to receive a hook bolt 54, and at each side of the tractor, a pair of chains 55 and 56 are hooked over the bolt 54 and extend downwardly, the chain 55 being connected at its lower end with the arm 46 at that side of the tractor while the other chain 56 is connected with the other arm 47.

As best shown in Figures 3, 4 and 5, the arms 46 and 47 and the associated chains 55 and 56 are so arranged that when the hand lever 34 is first swung forwardly from its rearmost position, the ratio of the amount of movement of the hand lever to the corresponding amount of movement upwardly of the rear portion of the frame 10 is relatively high, thus providing an easy lift when raising the tools out of the ground. As best shown in Figure 3, one of the forms of tools units that may be carried by the frame 10 is a plurality of spring teeth such as are usually employed in a field cultivator. This field cultivator tool unit is indicated in Figure 3 by the reference character $T^1$ and more detailed reference will be made to this particular tool unit below. It is to be noted at this point, however, that when the hand lever 34 is raised from its rearmost position to an intermediate position, at the relatively slow rate resulting from the high ratio just mentioned, the teeth are raised to or slightly above the ground surface, specifically, from the position shown in Figure 2 to the position shown in Figure 3. Due to the effort required to disengage the teeth from the ground, especially from, for example, a deep operating position, the above-mentioned high lifting ratio is particularly desirable. This is secured by the fact that the arms 46 are shorter than the arms 47 and to the fact that the arms 47 are displaced angularly in a counterclockwise direction from the arms 46 which, taken together with the fact that when the chains 55 are taut, as is necessary to initially lift the tools from the ground, the other chains 56 are slack. However, at about the point where the tools emerge from the ground, the longer arms 47 have been angularly displaced an amount sufficient to take the slack out of the chains 56, and following this the continued forward movement of the hand lever 34 now raises the frame 10 at a much greater rate, or, in other words, the ratio of movement of hand lever to the corresponding amount of movement of the frame is now appreciably decreased, so that the chains 55 go slack and the chains 56 support the frame and form the point of reaction for the arms 47 whereby the desired rapid lift after the tools emerge from the ground is secured.

The tool unit $T^1$, which, as mentioned above, preferably takes the form of a field cultivator unit, is especially constructed to be mounted on the rear ends of the longitudinal frame bars 11 and 12. The tool frame of the unit $T^1$ is indicated in its entirety by the reference numeral 60 and comprises a pair of transverse angles 61 and 62 connected together at their ends by end bars 63. Preferably, the forward transverse angle 61 is disposed so as to be adapted to be bolted in position underneath the rear end portions of the frame bars 11 and 12, as by bolts 65' which pass through the horizontal flange of the angle 61 and the horizontal flanges of the main frame bars 11 and 12, which also are angles in the preferred construction. Each of the side bars 63 has its forward end formed with a lateral section 64 and a rearwardly directed section 65, the lateral section being bolted to the vertical flange of the front transverse angle 61. At its rear end each of the end bars 63 carries a clip 66, and the rear transverse angle 62 rests upon and has its horizontal flange bolted or riveted to these clips 66, thereby disposing the angle 62 in a horizontal plane above the horizontal plane of the front angle 61. This disposes the rear angle 62 in a position to lie in the horizontal plane of the main frame angles 11 and 12, particularly the rear portions thereof, and the rear ends of the main frame angles 11 and 12 have their horizontal flanges apertured to receive bolts 67 which pass through apertures in the horizontal flange of the rear angle 62. Thus, the angles 61 and 62 of the tool unit frame serve to reenforce the main frame angles 11 and 12 and maintain them in the proper laterally spaced position.

The tool frame 60 also includes transverse reenforcing cross bars which, according to the principles of the present invention, serve also as attaching bars for the cultivator teeth. Preferably, these reenforcing bars are of identical construction and each is indicated by the reference numeral 70. Each of the reenforcing bars 70 includes a generally diagonal section 71, a forward lateral section 72 and a rearwardly directed straight section 73 at its front end, the rear end of the bar 70 including a straight rearwardly directed section 74. The vertical flange of the forward transverse angle 61 is provided with a plurality of apertures so as to receive bolt means 76, generally arranged in pairs, which fasten the lateral sections 72 of the several reenforcing bars 70 in position. The spacing of these bars is such that when the laterally outer bar is in position its rearwardly directed section 73 is spaced laterally inwardly a short distance from the adjacent straight section 65 of the end bar 63, the next laterally inward bar 70 being turned over and secured in place by the bolt 76 associated therewith so that its rear section 74 is disposed adjacent but slightly spaced from the straight section 74 of the first bar 70. Preferably, the spacing between the sections 74 is substantially the same as the spacing between the section 73 and the adjacent end bar section 65. The rear ends of the bars 70 are thus arranged in pairs, and these paired sections pass underneath the rear transverse angle 62 and are secured to the horizontal flange thereof by a pair of clips 81 which are bolted, as at 82, to the horizontal flange of the angle 62 and at 83 to the rear end portions of the bars 70.

As to the other laterally inward bars 70 the arrangement in pairs is substantially as just described and hence further description is believed to be unnecessary except to state that, as to the laterally inward bars 70, the two rearwardly directed sections 73 of adjacent bars are fixed to the front angle 61 in spaced apart relation corresponding to the spacing between the rear end sections 74 of the other bars and to the spacing between the sections 73 and 65, as mentioned above.

Between each pair of these spaced apart sections 73, 65; 73, 73 and 74, 74 a suitable tool support is disposed. Since as mentioned above the spacing between these pairs of sections are the same, the associated tool supports may be identical, and hence a description of one of them will suffice. Each tool support is indicated in its entirety by the reference numeral 85 and comprises a generally T-shaped casting 86 having a vertically disposed apertured web 87 and a lower notched section 88 which includes laterally arranged apertured ears 89. The vertical flange 87 of the casting 86 is formed to fit in between the associated sections of the reenforcing bars 70, and these sections are apertured to receive a pivot bolt 91 which mounts the associated tool support in position. The latter is capable of being angularly adjusted by means of a pin, such as a cotter key 92 passed through one of the plurality of openings in the flange or web 87 and resting on top of the associated reenforcing bar sections. A cultivator spring tooth of conventional construction, indicated by the reference numeral 94, is seated in the notch in the section 88 and is held in place by a clip and a pair of bolts which pass through the clip and the apertured ears 89. Tightening the bolts serves to clamp the associated tooth 94 in position, and by placing the pin 92 in one or the other of the several openings, indicated at 99 in the tool support web 87, the position of the tooth may be adjusted so as to provide for shallow, medium, or deep operation, as desired. The position of each tooth 94 may also be adjusted by securing the same in different positions relative to the supporting casting 86.

If desired, the tool unit $T^1$ may be provided with a pair of gauge wheels, indicated by the reference numeral 100. Preferably, each gauge wheel 100 is mounted for rotation on the lower end of a gauge wheel shank 101, the upper end of which is received for vertical adjustment in a bracket 103 held to the front angle 61 by a pair of U-bolts 104. A pin or bolt carried by the bracket 103 is adapted to be disposed in one or the other of a plurality of openings 106 formed in the rear side of the gauge wheel shank 101 at the upper end thereof. The shank 101 is held against displacement by a brace rod 110 which is secured at its front end to the shank 101 by a clamp 111 and at its rearward end is connected by a clamp 112 to the diagonal portion of the adjacent reenforcing bar 70.

The implement as described above, including the main frame 10 and the tool unit $T^1$, is also adapted to be hitched to a tractor of the type having a power lift. This type of tractor is shown in Figure 5, and referring now to this figure the tractor having a power lift is indicated in its entirety by the reference numeral 1a and is constructed substantially the same as the tractor 1 described above, except that a power lift unit, indicated in its entirety by the reference numeral 120, is mounted on the tractor and includes a rockshaft 121 which is adapted to be rocked from a lowered position through substantially sixty degrees, more or less, to an upper or raised position. A power lift of this type is shown in the prior United States patent to E. McCormick et al., 2,107,760, dated February 8, 1938, to which reference may be had if necessary. According to the principles of the present invention, secured to each end of the power lift rockshaft 121 is an arm 122 which when the power lift shaft 121 is in a lowered position, extends generally downwardly toward the arm 46 on the transverse rockshaft 31. When the tractor is equipped with a power lift, the arms 47 and the associated chains 56 are omitted, the chain 55 being used in this form to connect the arm 46 with the power lift rockshaft arm 122 at each side of the tractor. It will be noted from Figure 5 that when the implement is in a lowered or operating position the chain 55 and the arm 122 at each side of the tractor are disposed more or less in a straight line relation. Hence, when the tractor power lift is actuated to raise the implement into a transport position, the first lifting movement takes place at a ratio of movement of power lift arm to corresponding movement of the implement frame in a vertical direction that is relatively high, thus preventing any tendency to overload the lower lift unit of the tractor when raising the implement with the tools still in the ground. After the tools have been lifted clear of the ground, the chain 55 extends more or less at right angles to the arm 122 and hence the lift is more rapid. In this respect, the power lift connections act in somewhat the same way as the hand lift connections described above. In both cases, the initial lifting action is relatively slow until the tools emerge from the ground, and then the lifting action is more rapid. This provides for a substantially uniform application of power, whether through the tractor power lift or through a hand lever.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a tractor-propelled integral implement, frame means adapted to be pivoted at its forward end to the tractor, tool means carried at the rear of said frame means rearwardly of the tractor and including ground working tools, a rockable member supported on said frame means adjacent the rear of the tractor and including angularly related arms, means to rock said rockable member, and a pair of suspension means, each connected at its lower end to one of said arms and both connected at their upper ends with the tractor, the lengths of said suspension means and the angular disposition of said arms being arranged so that during the first part of the movement of said rockable member in the raising direction said frame means is raised at one ratio, movement of said rockable means through its second range of movement acting to raise said frame means relative to the tractor at a different ratio.

2. An agricultural implement comprising support means, tool-carrying frame means movably connected therewith and including a pair of laterally spaced generally longitudinally extending frame bars, means serving as a rockshaft journaled on said longitudinally extending frame bars and extending laterally outwardly therefrom, a pair of angularly related arms fixed to each end of said rockshaft adjacent the corresponding longitudinally extending frame member, one arm being longer than the other arm, a pair of suspension connections extending, respectively, from said arms to said support, and a hand lever fixed to said rockshaft means for rocking the latter and said arms, the latter and the lengths of said suspension means being arranged whereby rocking movement of said rockshaft through one range acts first through the shorter arm and the associated suspension means to raise the implement frame means at a relatively high ratio of movement of hand lever to the corresponding upward movement of the implement frame means, movement of the hand lever through its other range of movement acting through the longer arm and the corresponding suspension means to raise said implement frame means relative to the tractor at a ratio of movement of hand lever to the corresponding upward movement of the frame means which is substantially less than said first mentioned ratio.

3. An agricultural implement comprising support means, tool means shiftably connected therewith, lever means carried by said tool means and having two spaced apart portions, means connecting one portion with said support means whereby movement of the lever means through one range serves to adjust the operating position of said tool means, and means connecting the other portion of said lever means with said support means so as to react against the latter, when said lever means moves through another range of movement, and raise said tool means relative to said support means and out of contact with the ground.

4. In a tractor-propelled integral implement, frame means adapted to be pivoted at its forward end to the tractor, tool means carried at the rear of said frame means rearwardly of the tractor and including ground working tools, a rockable member supported on said frame means adjacent the rear of the tractor and including angularly related arms, means to rock said rockable member, and a pair of connections between said arms and the tractor, each of said connections being in the nature of one way connections whereby either of said arms may move upwardly freely relative to the tractor, the lengths of said connections and the angular disposition of said arms being arranged so that during the first part of the movement of said rockable member in the raising direction said frame means is raised at one ratio, movement of said rockable means through its second range of movement acting to raise said frame means relative to the tractor at a different ratio.

WILLIAM A. HYLAND.
ERNST E. SCHNELL.

REFERENCES CITED

The following references are of record in the file of this patent:

UNITED STATES PATENTS

| Number | Name | Date |
| --- | --- | --- |
| 2,005,568 | Smith | June 18, 1935 |
| 2,328,173 | Silver | Aug. 31, 1943 |
| 2,039,316 | Johnston | May 5, 1936 |
| 2,039,801 | Johnston | May 5, 1936 |
| 622,093 | Welch | Mar. 28, 1899 |
| 390,276 | Young | Oct. 2, 1888 |
| 822,795 | Wickham | June 5, 1906 |
| 704,500 | Blood | July 15, 1902 |
| 2,286,619 | Hokanson | June 16, 1942 |
| 2,172,980 | Kriegbaum | Sept. 12, 1939 |
| 2,221,769 | Hipple | Nov. 19, 1940 |
| 659,576 | Carter | Oct. 9, 1900 |
| 2,302,842 | Cook | Nov. 24, 1942 |
| 499,415 | Cardinal | June 13, 1893 |
| 2,005,555 | Morkovski | June 18, 1935 |